May 27, 1969
P. MOURY
3,447,064
ELECTRONIC DEVICE FOR CONTROLLING THE MEAN CURRENT
SUPPLIED BY A THYRISTOR CIRCUIT
Filed Jan. 26, 1965
Sheet 1 of 2
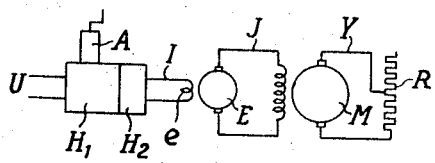
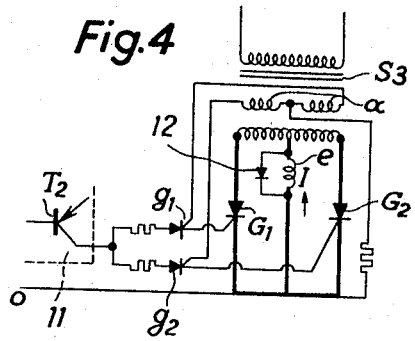
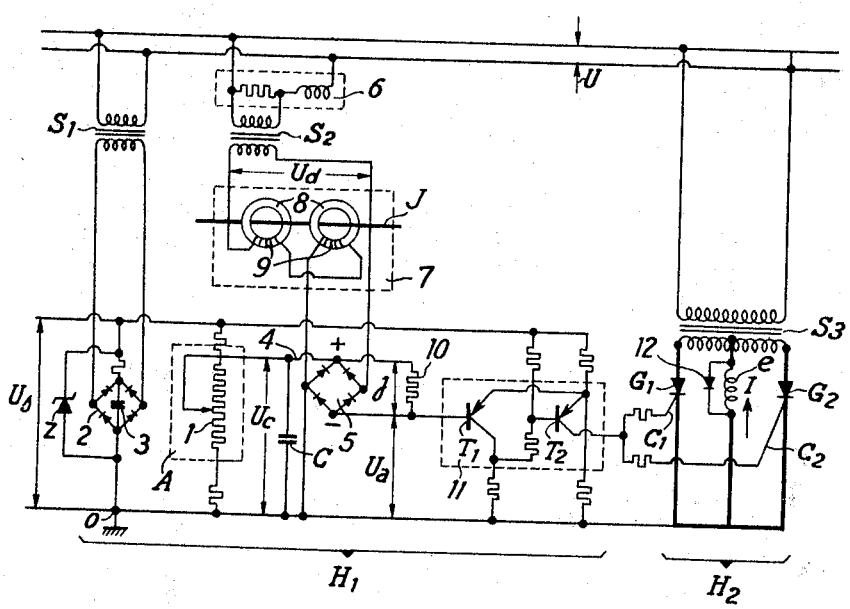
INVENTOR
Pierre MOURY
BY
ATTORNEYS United States Patent Office 3,447,064
Patented May 27, 1969

3,447,064
ELECTRONIC DEVICE FOR CONTROLLING THE MEAN CURRENT SUPPLIED BY A THYRISTOR CIRCUIT
Pierre Moury, Paris, France, assignor to Forges et Ateliers de Constructions Electriques de Jeumont, Paris, France
Filed Jan. 26, 1965, Ser. No. 428,037
Claims priority, application France, Jan. 31, 1964, 962,173
Int. Cl. H02m 1/08, 7/44, 7/68
U.S. Cl. 321—18         3 Claims

ABSTRACT OF THE DISCLOSURE

This invention relates to an electronic device for controlling the current delivered by a thyristor circuit comprising an alternating supply voltage, a transducer having a primary winding energized by a current to be controlled and having an output voltage proportional to the controlled current, an electronic trigger, and thyristor means having controlled electrodes connected to the electronic trigger. The output voltage of the transducer is compared to a reference voltage to produce a voltage difference which is applied to the electronic trigger. The transducer is arranged so that its output voltage is interrupted sharply at each alternation of the supply voltage so that a sharp increase of the voltage difference is produced which causes the opening of the electronic trigger which, in turn, causes the conduction of the thyristor means, whereby the conduction of the thyristor means is independent of the operating differential of the electronic trigger. The conduction of the thyristor means is maintained or suppressed for the next alternation of the voltage supply depending on the value of the controlled current.

---

Figure 3:
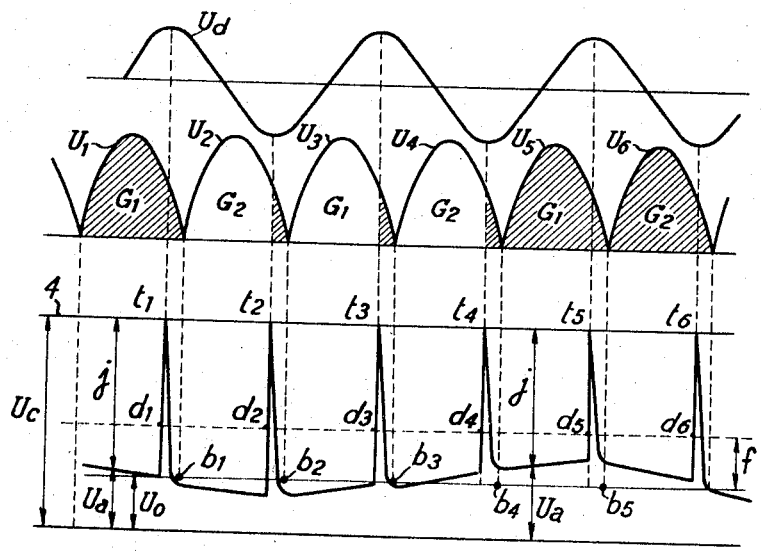

This invention relates to a method of electronic control for the D.C. output of rectifiers.

In one very well-known method of this kind, the rectifier control electrodes are supplied by measuring elements which have an operating differential—i.e., the input values which operate the measuring elements vary according as such values are increasing or decreasing—and which deliver positive pulses of varying phase shift to initiate the consecutive alternations of the supply current with varying delay and thus vary the mean value of the rectified current.

This invention has as its subject matter a control method which improves the accuracy and stability of the known method yet simplifies the apparatus required. These advantageous results are achieved by means of a two-step action control of rectifier conductivity by measuring elements which act on the rectifier control electrodes without any operating differential. The method according to the invention is of use more particularly but not exclusively for so controlling the rectified current used to excite a D.C. generator that the current delivered by the generator armature can be maintained constant at an adjustable value.

According to the invention, the control electrodes of the excitation rectifiers are in this case supplied via an electronic trigger operated by a transducer, the armature current flowing through the primary winding of the transducer, the secondary voltage thereof being briefly interrupted during an alternation in order to use only the top threshold of the trigger operating differential to control the conductive state of the rectifiers throughout the following alternations.

The working of the control method according to the invention will now be studied in greater detail with reference by way of non-limitative example to its use in the rheostatic braking of a traction motor, reference being made to the accompanying drawings wherein:

FIG. 1 is a basic diagram showing the main circuits;
FIG. 2 is the general circuit diagram for the control system;
FIG. 3 shows graphs explaining the operation, and
FIG. 4 is a partial diagram showing an alternative form of control system.

Referring to FIG. 1, a traction motor M can operate as a generator whose output is applied across a variable resistance R to brake a vehicle at a constant force. To meet this requirement, the current Y delivered by the generator, and the generator exciting current J delivered by a separately excited exciter E, must both be maintained constant. An auxiliary motor (not shown) drives the exciter E. The current Y is controlled in known manner by the resistance R being reduced in proportion as speed decreases, and the invention relates to the system for controlling the exciting current J to a given value $J_c$. The control system according to the invention is represented in diagrammatic form in FIG. 1 by the elements $H_1$, $H_2$ and acts on the exciting current I of the exciter, the current $J_c$ being determined by the driver's controller A. The source for the current I is an A.C. voltage U assumed to be single-phase in this example. The voltage U and the speed of the exciter are assumed to be constant for the purposes of the description but may vary, for instance, because of supply voltage variations, without upsetting operation provided that the exciter and the control elements are dimensioned accordingly.

FIG. 2 diagrammatically shows the control system according to the invention and represented by the elements $H_1$, $H_2$ in FIG. 1. As FIG. 2 shows, the A.C. voltage U is applied:

(1) Via a transformer $S_1$ to a rectifying bridge 2 conventionally connected to a capacitor 3 and to a Zener diode Z, the object being to provide a stabilized voltage $U_s$ which feeds an electronic trigger 11 and a resistance 1, the latter being adjustable by the controller A and having a portion shunted by a capacitor C.

(2) Via a transformer $S_2$, whose primary winding can be adjusted by means of a phase shifter 6, to energizing windings 9 of a transducer 7 of a kind known per se. The windings 9 are arranged in opposition on two saturable cores 8 which the current J also energizes and are in series with a Graetz bridge 5 delivered to a resistance 10 whose positive terminal is, as can be seen, connected by a connection 4 to the negative end of the constant portion of the resistance 1.

(3) Via a transformer $S_3$ and two control push-pull thyristors $G_1$, $G_2$, to energizing windings e of the exciter E, a diode 12 being connected across the winding e.

The trigger 11 is embodied in known manner by two transistors $T_1$, $T_2$; the collector of transistor $T_2$ is connected to control electrodes $C_1$, $C_2$ of the thyristors $G_1$, $G_2$. The trigger 11 is so devised that $T_1$ opens and $T_2$ closes when the input voltage $U_a$ drops below a lower threshold $U_o$, whereas $T_1$ closes and $T_2$ opens when the input voltage $U_a$ increases above $U_o+f$, $f$ denoting the operating differential or operating range of the trigger. As FIG. 2 shows, the input voltage $U_a$ is equal to the difference between the voltage $U_c$ applied by the potentiometer 1 and the rectified voltage $j$ across the resistance 10.

The operation of the control system will now be described with reference to FIG. 3.

The thyristors $G_1$, $G_2$ receive their closing and opening signals from the measuring trigger 11 which is supplied by the measuring transducer 7 associated with the bridge 5 and resistance 10. When the two thyristors $G_1$, $G_2$ are open (conductive), the current I increases in accordance with a relationship dependent upon the resistance and the inductance of the winding $e$. When the two thyristors $G_1$, $G_2$ are closed, the current I decreases, being short circuited via the diode 12. A feature of the circuit arrangement formed by the elements 7, 5, 10 is of course that it produces across the resistance 10 a voltage $j$ proportional to the current J to be measured, except that the voltage $j$ is briefly interrupted near the maximum of each alternation of the source $U_d$; the phase shifter 6 is adjusted so that such interruption occurs at times $t_1$, $t_2$, $t_3$ and so on (FIG. 3) slightly before the end of each alternation $U_1$, $U_2$, $U_3$ and so on. The thyristors $G_1$, $G_2$ therefore opens systematically slightly before the end of each alternation at the times $t_1$, $t_2$, $t_3$ and so on, whatever the current J may be, and are therefore conductive and supply the winding $e$ slightly before the end of each alternation.

The voltage $j$ proportional to the current J is compared with the reference voltage $U_c$ tapped off by the resistance 1 (FIG. 2) from the stabilized D.C. voltage $U_s$; the voltage difference $U_o$ is applied to the input of the trigger 11 which acts as follows at the start of each alternation.

If the voltage $j$ is too low (J smaller than $j_c$ and $U_a$ greater than $U_o$), as is the case with the alternations $U_1$, $U_5$, $U_6$, the thyristors stay open and the current increases. If J is too great (alternations $U_2$, $U_3$, $U_4$), the thyristors close immediately and become non-conductive from the start of the next alternation and the current I decreases. The thyristors open again at the end of the alternation, as already stated, but for so brief a time and at such a low voltage that the current I stays very small.

Consequently, the brief interruption of the voltage $j$ at each alternation produces a systematic opening of the thyristors at the end of each alternation, and this opening is either maintained or cancelled according as J is too small or too large at the start of the next alternation. For instance, as FIG. 3 shows, the alternations $U_2$, $U_3$, $U_4$ have not started at the times $b_1$, $b_2$, $b_3$ because the voltage $j$ is too great, whereas the thyristors are open during the alternations $U_5$, $U_6$ following the times $b_4$, $b_5$ because the voltage $j$, and therefore the current J, are too small.

The spiked curve at the lower part of FIG. 3 represents the voltage $U_a$.

As will be apparent, the trigger 11 is adjusted to close the thyristors when the current J is such that $U_a$ is smaller than $U_o$; because of its operating differential $f$ previously referred to, the trigger 11 can open only when $j$ is such that $U_a$ is greater than $U_o + f$—i.e., when $U_a$ is beyond the ordinates $d_1$, $d_2$, $d_3$ and so on in FIG. 3. The points $d_1$–$d_6$ represent the intersection between the horizontal dotted line corresponding to the level of the voltage $U_a + f$ and the front slope of each spike of the above-mentioned spiked curve. As a rule, $f$ must be small if a trigger is to operate accurately, but the systematic cancellation of the voltage $j$ at each alternation means that the value of $f$ ceases to be important, and so operation is as if the trigger were an ideal trigger having zero operating range.

The great advantage of this arrangement is that, without the provision of any other means, the current J can be controlled without hunting, since most hunting is caused by the difference between the current values causing J to increase or decrease, and this difference is exactly the operating differential or operating range of the control.

As will be apparent, for satisfactory operation there must be a correct phase shift of the voltage $U_d$ supplying the transformer 7. This phase shift is near $\pi/2$ for a sinusoidal voltage but may be something completely different if the voltage has high harmonic contents.

The variant shown in FIG. 4, corresponds to the element $H_2$ in FIG. 2 in which a third winding $a$ is added to the transformer $S_3$, a resistor connected to the center of the winding $a$ two auxiliary resistors $g_1$ and $g_2$ are also added, and the phase shifter is eliminated. The element $H_2$ helps to obviate any considerable and adjustable phase shift and can provide satisfactory operation despite harmonics. The result of omitting the phase shifter 6 is that the systematic brief interruption of the voltage $j$ occurs at full alternation, so that the trigger 11 delivers its output systematically at full alternation. However, the delivery is very brief if J is too large, but if J is too small, delivery continues until J becomes too large. This output current opens the thyristors $G_1$, $G_2$ via two auxiliary thyristors $g_1$, $g_2$ provided that the latter are open. The auxiliary thyristors are opened by an auxiliary winding $a$ of the transformers $S_3$, the latter winding being so connected that the thyristors $g_1$ is opened by its control electrode when the thyristor $G_1$ is fed by reverse voltage and so cannot conduct, et sim $g_2$ and $G_2$. Consequently, once J becomes too large the brief delivery from the trigger has no effect on $G_1$, $G_2$, the same cutting off and staying cut off from the end of the alternation actually occuring. When J becomes too small, the systematic delivery of the trigger continues, since $g_1$ stays open if $T_2$ is also open, and $G_1$ becomes conductive when supplied with D.C. Similarly, $g_2$ acts in the same way, but with a shift of one alternation, to open $G_2$; $G_1$, $G_2$ therefore stay open and deliver in turn from the end of the alternation actually occurring.

The result is therefore the same as with the first embodiment—i.e., a control which does not depend on the operating range or on the differential of the trigger—except that there is no residual delivery from the thyristors when J is too large. This is a negligible advantage in the light of the sought-for-improvement, namely the omission of the phase shifter and satisfactory operation despite possible distortions of the voltage U, such distortions being greatly affected by the load when the source is a single-phase alternator.

In both the cases considered, the main purpose of the capacitor C is to oppose any operation with oscillations due to the time constant of the exciting circuits; the effect of the capacitor C is to make variations in the reference voltage slow enough for the control to occur without appreciable offset.

Of course other means than the phase shifter of the first embodiment or the auxiliary thyristors of the variant can be used to achieve the same result without departing from the scope of the invention.

I claim:
1. An electronic device for controlling the mean current delivered by a thyristor circuit comprising:
   an alternating voltage supply;
   a transducer having a winding energized by a current to be controlled and having an output voltage proportional to said controlled current;
   an electronic trigger;
   thyristor means having controlled electrodes connected to said electronic trigger;
   means for rectifying said voltage supply to produce a continuous reference voltage;
   means for comparing the output voltage of the transducer with the reference voltage and for applying the voltage difference to said electronic trigger;
   said transducer being arranged so that its output voltage is interrupted sharply at each alternation of the voltage supply to produce a sharp increase of said voltage difference which causes the opening of said electronic trigger which, in turn, renders said thyristor means conductive whereby the conduction of said thyristor means is independent of the operating differential of said electronic trigger, the conduction of said thyristor means being maintained or suppressed for the following alternation of the supply voltage depending on the value of the controlled current.

2. A device as recited in claim 1, wherein the transducer has an input voltage provided by a phase shifter adjusted so that the short interruptions of the said output voltage systematically appear a little before the end of each alternation of the supply voltage.

3. A device according to claim 1, wherein the thyristor means comprises main and auxiliary thyristors, the electronic trigger acting on the main thyristors through the interposed auxiliary thyristors having controlled electrodes, a transformer for supplying an alternating voltage to said main thyristors, said transformer having an auxiliary winding connected to the controlled electrode of said auxiliary thyristors for causing the opening of the auxiliary thyristors when the main thyristors are fed by the negative portion of said alternating voltage.

References Cited

UNITED STATES PATENTS

| | | | |
|---|---|---|---|
| 3,325,716 | 6/1967 | Yoshiyuki Gomi | 321—45 XR |
| 2,862,174 | 11/1958 | Hansen et al. | 322—76 X |
| 3,069,616 | 12/1962 | Curtiss | 322—79 X |
| 3,179,874 | 4/1965 | Guennov | 322—27 X |
| 3,211,985 | 10/1965 | Torok | 321—18 |
| 3,214,667 | 10/1965 | Foster et al. | 323—22 X |

FOREIGN PATENTS

| | | |
|---|---|---|
| 1,155,522 | 10/1963 | Germany. |
| 664,188 | 1/1952 | Great Britain. |

LEE T. HIX, *Primary Examiner.*

W. M. SHOOP, JR., *Assistant Examiner.*

U.S. Cl. X.R.

321—45; 322—27